United States Patent
Whisler

[11] 3,967,850
[45] July 6, 1976

[54] GRAB HANDLE AND DOOR STOP ASSEMBLY

[75] Inventor: Edwin Lee Whisler, Peosta, Iowa
[73] Assignee: Deere & Company, Moline, Ill.
[22] Filed: Dec. 20, 1974
[21] Appl. No.: 534,734

[52] U.S. Cl. .............................. 296/146; 49/460; 292/272; 292/338
[51] Int. Cl.² ...................................... B60J 5/04
[58] Field of Search ............. 296/146; 49/394, 460; 292/271, 272, 275, 268, 338

[56] References Cited
UNITED STATES PATENTS
1,618,353  2/1927  Rice .............................. 292/272 X
3,747,273  7/1973  Johnson .............................. 49/394

FOREIGN PATENTS OR APPLICATIONS
624,763  4/1927  France .............................. 292/271
18,122  9/1908  Norway .............................. 292/272

Primary Examiner—Robert J. Spar
Assistant Examiner—Donald W. Underwood

[57] ABSTRACT

A vehicle cab is provided with a structure which includes a pivotal rod that serves as a grab handle for aiding an operator in mounting the vehicle and cooperates with a guide bracket fixed to the cab door so as to resist movement of the door from an open position toward a closed position.

1 Claim, 4 Drawing Figures

GRAB HANDLE AND DOOR STOP ASSEMBLY

BACKGROUND OF THE INVENTION

The present invention relates to a vehicle cab and more particularly relates to means for yieldably holding a cab door in its open position.

It is known to provide operator cabs with some sort of mechanism including an arm or the like which becomes detented when the cab door reaches an open position, the detented arm acting to yieldably rsist movement of the door towards its closed position. In cases where the cab is elevated a considerable distance from the ground, handles are often secured to the inside of the doors thereof to aid the operator in climbing into and out of the cab. This results in a problem being created since if the detent is too weak, the operator will pull the door towards its closed position when he is climbing into the cab. If the detent is too strong, the operator will experience difficulty in pulling the door closed after he is seated.

SUMMARY OF THE INVENTION

According to the present invention, there is provided an operator's cab which includes a door that is provided with a grab handle and a stop which overcomes the problems noted above as being attendant with prior art structures.

An object of the invention is to provide a cooperating structure which performs both as a grab handle and as a door stop.

A more specific object is to provide a cooperating structure, as described in the foregoing paragraph, which includes a rod pivotally mounted on framework of the cab and including an end portion received in a guide slot formed in a bracket carried by the inside of the door, the rod being shaped and disposed so as to serve as a grab handle and the end portion thereof cooperating with a detent notch defined by the guide slot to hold the door in an open position until the rod is pulled with a jerk in a direction tending to close the door.

These and other objects will become apparent from a reading of the following description in conjunction with the appended drawings.

DESCRIPTION OF THE PREFERRED EMBODIMENT

Figure 1:
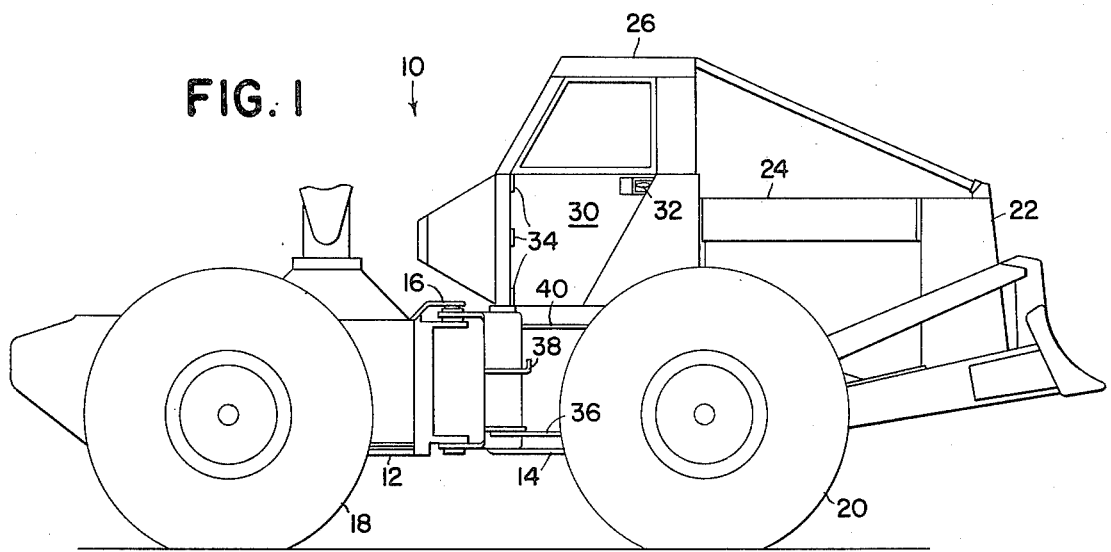
FIG. 1 is a left side elevational view of an industrial tractor having a door structure embodying a grab handle and door stop constructed according to the principles of the present invention.

Referring now to FIG. 1, therein is shown an industrial tractor 10 of an articulated type including front and rear sections 12 and 14, respectively, interconnected by a vertical pivot assembly 16 and respectively supported on front and rear pairs of ground wheels 18 and 20, respectively, of which only one of each pair is shown.

Although not shown here, the front section 12 may support a plurality of tree harvesting devices such as those disclosed in U.S. Pat. No. 3,833,034, issued to Menzel et al on Sept. 3, 1974.

Mounted rearwardly on the rear section 14 is an engine (not shown) enclosed in a compartment defined by a grill housing 22 at the rear end of the section and a hood 24 extending forwardly from the grill housing to the rear wall of a cab 26. The left side of the cab 26 is provided with a door 30 embodying a latch mechanism of a conventional type (not shown) which is operable through means of a door handle 32 located adjacent the rear edge of the door 30. The forward edge of the door 30 is hinged as at 34 to framework of the cab 26 so as to permit the door to be swung forwardly once the latch mechanism has been unlatched by the door handle 32. As the cab 26 is located a considerable distance above the ground, located on the rear section 14 from the ground up are vertically spaced steps 36, 38 and 40 to aid the operator in getting in and out of the cab 26.

Figure 2:
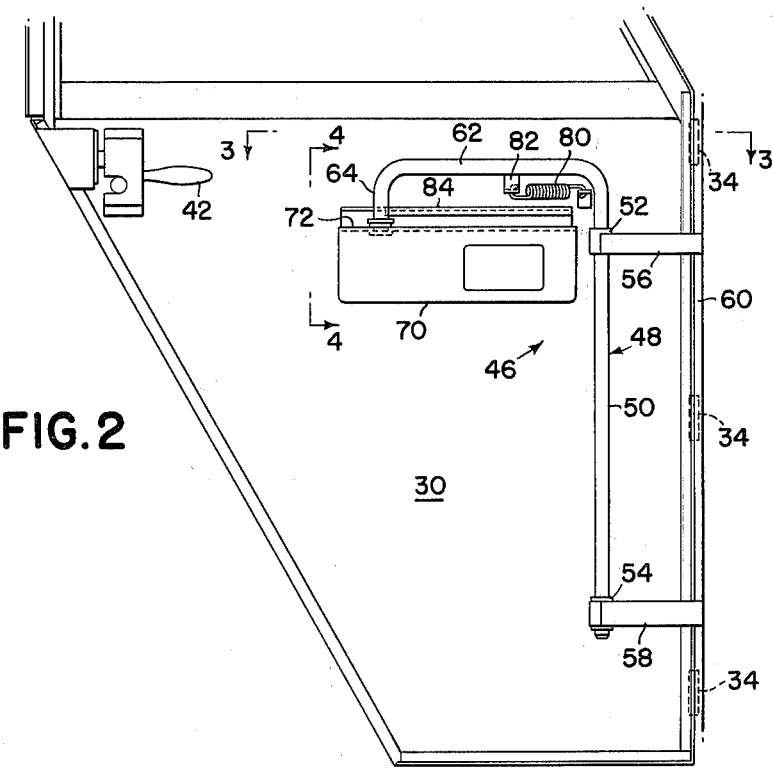
FIG. 2 is a left side view of the inside of the door structure shown in FIG. 1 with the door shown in its closed position.
Figure 3:
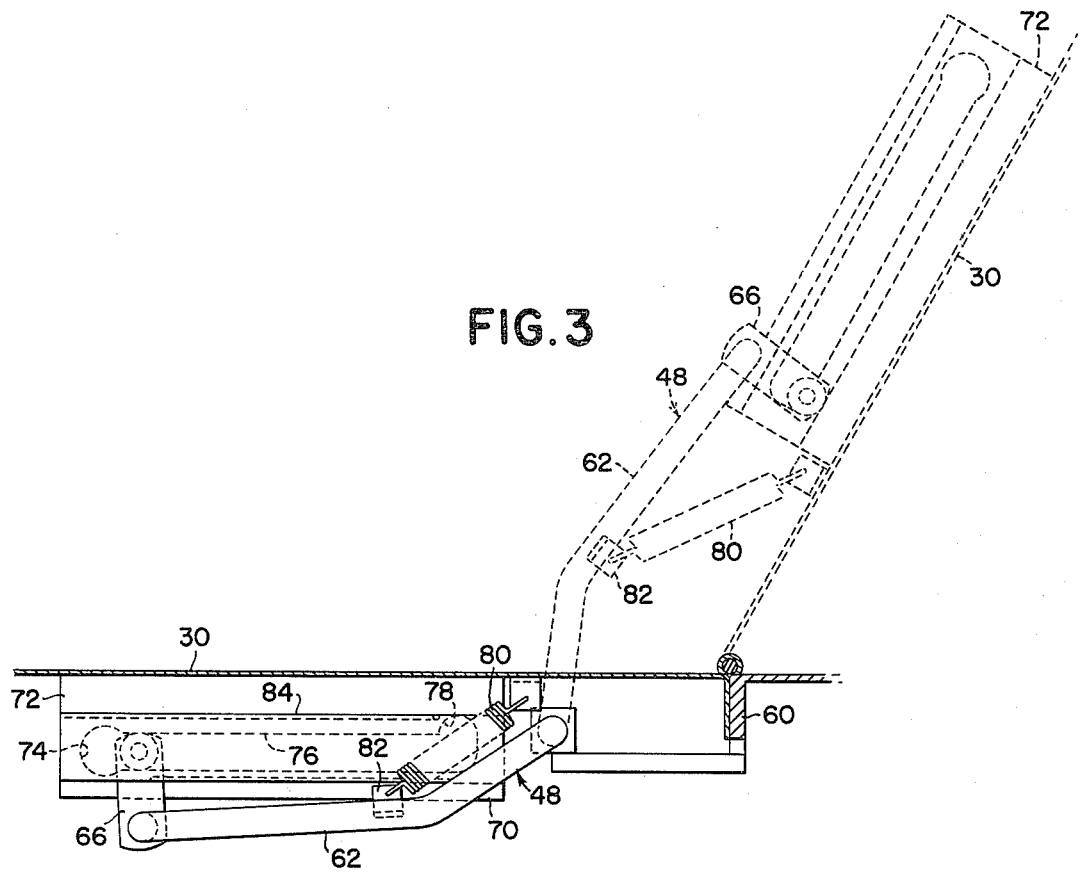
FIG. 3 is an enlarged sectional view taken along the line 3—3 of FIG. 2 with the door shown in a full-line closed position and a dashed-line open position.
Figure 4:
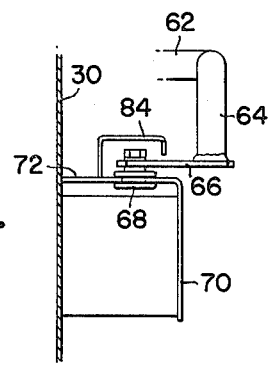
FIG. 4 is an enlarged sectional view taken along line 4—4 of FIG. 2.

Referring now to FIGS. 2–4, it can be seen that the door 30 is provided with an inside door handle 42 serving the same purpose as the door handle 32, that is to say to release the latch mechanism which normally holds the door 30 closed. The door handle 42 is located so as to be in easy reach of an operator seated in a seat (not shown) located within the cab 26.

Located inside the cab 26 and combined with the door 30 is a grab handle and door stop assembly 46. The assembly 46 comprises a rod 48 including a vertical mounting section 50 swivelly mounted in upper and lower axially aligned tubular receptacles 52 and 54, respectively. The receptacles 52 and 54 are respectively secured to one of the ends of a pair of support straps 56 and 58, having opposite ends fixed to a frame member 60 of the cab 26. The upper end of the vertical section 50 of the rod 48 terminates into a horizontal grab handle section 62 having a terminal downturned end 64. Secured to the bottom of the end 64 is a short strap 66 having a roller 68 mounted at the end thereof. Fixed to the inside of the door 30 is a bracket 70 having a horizontal plate portion 72 provided with a vertical guide opening 74 including a central portion 76 extending parallel to the door 30 and terminating in a detent recess 78 extending therefrom toward the door 30. The roller 68 is guidingly received in the central portion 76 and the length of the central portion 76 is such that when the door reaches its dotted-line position shown in FIG. 3, the roller will be adjacent to the detent recess 78 and will be moved thereinto by a spring 80 connected between the door 30 and a tab 82 secured to the grab handle section 62 of the rod 48. In order to prevent an operator from accidentally getting his hand pinched in the guide opening 74 by the roller 68, the bracket 70 includes a shield 84 which extends over the guide opening 74.

The operation of the grab handle and door stop assembly 46 is as follows. Assuming that the door 30 of the cab 26 is closed and that an operator wishes to enter the cab 26, he will normally proceed up the steps 36, 38 and 40 until he can grab the handle 32 whereupon he will unlatch the door 30 and swing it open to the dashed-line position shown in FIG. 3. As the door is moving from its closed position to its open position, the roller 68 will travel in a central portion 76 of the guide opening and will move into the detent recess 78 when the door 30 is fully opened. The spring 80 will act to maintain the roller in the recess 78. Since the grab handle section 62 is at an elevation approximately the same as the door handle 32, the grab handle section will be available for the operator to grab and help himself on into the cab. If the operator does grab the grab handle section 62 while entering the cab 26, the force he exerts on the grab handle section 62 will be directed downwardly and outwardly relative to the handle and normally will not be sufficient to disengage the roller 68 from the detent recess 78. Once the operator is inside the cab and seated in the seat, he can pull the door shut by grasping the grab handle section 62 and pulling rearwardly thereon with a quick jerk. Since the door 30 is quite heavy compared to the rod 48 and since the force exerted on the grab handle section 62 is rearwardly and generally horizontal, the roller 68 will be moved out of the detent recess 78, thus permitting the door 30 to be pulled closed by means of the rod 48.

While the grab handle and door stop assembly 46 is shown here embodied in a forestry-type vehicle, it should be understood that it is equally applicable to any vehicle which has an elevated cab requiring the operator to walk up steps in order to enter the cab.

I claim:

1. In combination with a vehicle cab including a framework defining a door opening and a door hingedly secured to the framework for swinging movement about a first upright axis between a closed position and an open position relative to said opening, a combined door stop and handle means, comprising: a bracket secured to an inside wall of said door and defining track means extending widthwise of said door; a grab handle pivotally mounted on said framework for movement about a second upright axis; said grab handle including a hand grippable portion traversing said first upright axis and located further away from the inside wall of said door than the bracket and extending in general parallelism to the guide track means and elevated above the bracket a distance sufficient to permit easy insertion of an operator's hand between the hand grippable portion and the bracket; an end portion depending from the hand grippable portion and including a horizontal portion extending toward the inside wall and including a roller means received in said guide track means; said guide track means and grab handle being so disposed relative to each other that said roller means travels between first and second locations in said guide track means when said door is moved from its closed to its open position, detent means located at said second location in said guide track means for frictionally resisting initial movement of said door from its open to its closed position and a protective shield extending, from a location on the bracket between the guide track means and the inside wall of the door over the guide track means at a level above said horizontal portion of the grab handle for preventing the operator's hand from accidentally entering the guide track means where it is vulnerable to being pinched.

* * * * *